W. T. DOYLE.
APPARATUS FOR MANUFACTURING ACID PHOSPHATE OR SUPERPHOSPHATE.
APPLICATION FILED MAR. 13, 1920.
1,383,911.
Patented July 5, 1921.
2 SHEETS—SHEET 1.
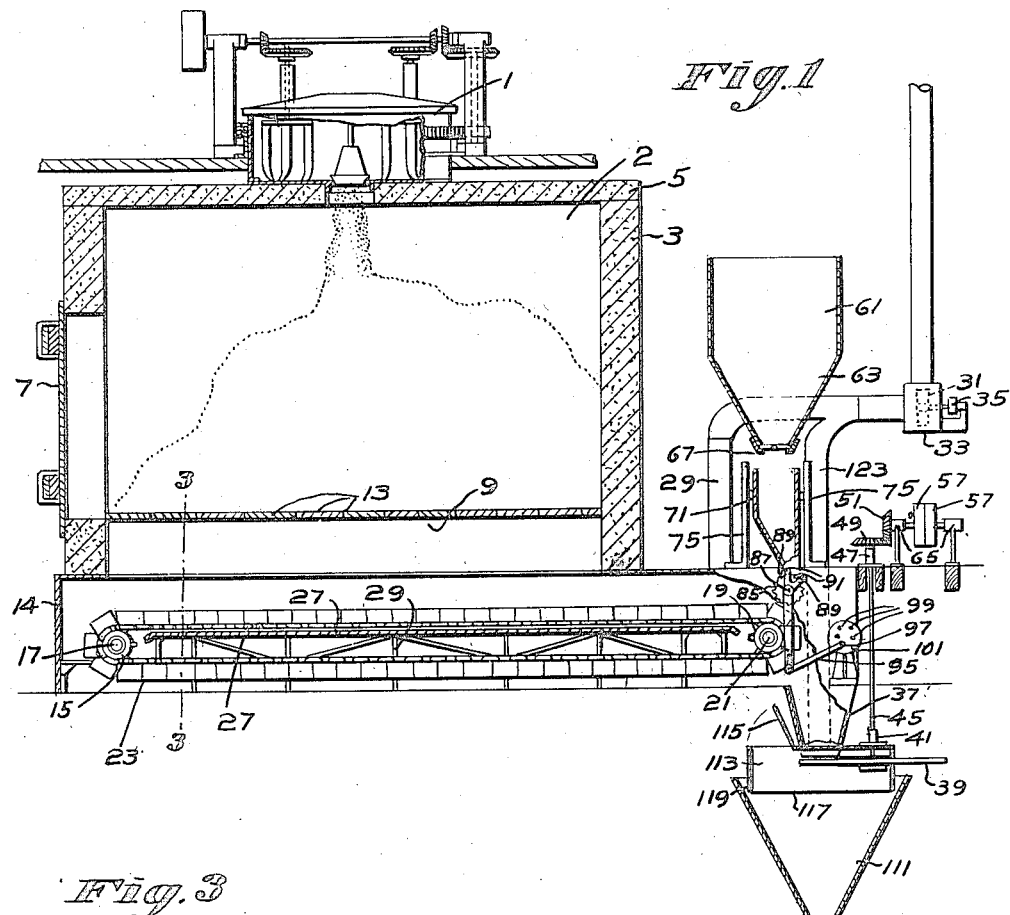
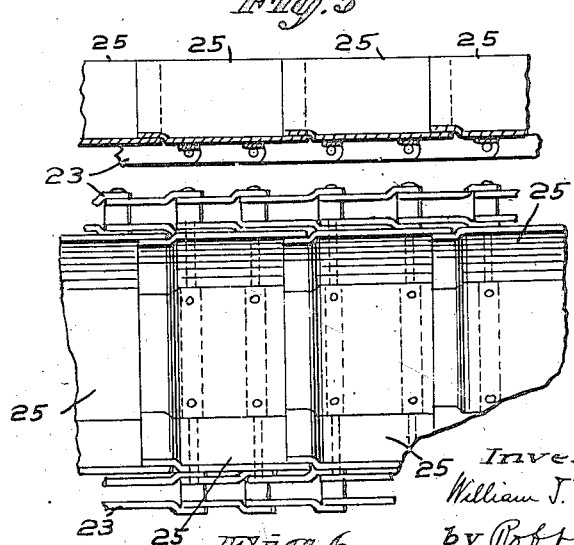

W. T. DOYLE.
APPARATUS FOR MANUFACTURING ACID PHOSPHATE OR SUPERPHOSPHATE.
APPLICATION FILED MAR. 13, 1920.

1,383,911. Patented July 5, 1921.

Inventor
William T. Doyle
By Robt. P. Harris
Attorney

UNITED STATES PATENT OFFICE.

WILLIAM T. DOYLE, OF BOSTON, MASSACHUSETTS, ASSIGNOR TO STURTEVANT MILL COMPANY, OF BOSTON, MASSACHUSETTS, A CORPORATION OF MASSACHUSETTS.

APPARATUS FOR MANUFACTURING ACID PHOSPHATE OR SUPERPHOSPHATE.

1,383,911. Specification of Letters Patent. Patented July 5, 1921.

Application filed March 13, 1920. Serial No. 365,558.

*To all whom it may concern:*

Be it known that I, WILLIAM T. DOYLE, a citizen of the United States, residing at Boston, in the county of Suffolk and State of Massachusetts, have invented an Improvement in Apparatus for Manufacturing Acid Phosphate or Superphosphate, of which the following description, in connection with the accompanying drawings, is a specification, like characters on the drawings representing like parts.

One important source of acid phosphate is in a phosphate rock which is found in Florida, Tennessee and other places. This rock contains phosphoric acid as tribasic phosphate of lime which is insoluble in water, and consequently when applied to the soil, cannot be assimilated by plants. Therefore, it is necessary to convert the insoluble phosphoric acid in phosphate rock into soluble phosphoric acid. This is accomplished usually by treating the ground rock phosphate with sulfuric acid or hydrochloric acid (usually the former) which removes two parts of the lime as gypsum and leaves one part of the lime combined with phosphoric acid as monobasic or acid phosphate of lime soluble in water.

Heretofore, the ground phosphate rock and diluted sulfuric acid, for example, 1,000 lbs. of each, are introduced into a mixer where the masses are thoroughly mixed and then discharged into a large chamber generally built of concrete and known as a den. A chemical reaction takes place in this den which generates heat, which in turn converts the water of the diluted sulphuric acid into steam.

The mixture is allowed to stand about twelve hours in the den, and then it is removed and conveyed to a curing pile, where it is allowed to remain a sufficient length of time for the chemical reaction to continue, and further convert insoluble phosphoric acid into soluble phosphoric acid.

There are certain objections to the method heretofore practised. Noxious fumes accompanying the chemical reaction taking place in the den are very objectionable and injurious to workmen employed in, removing the material from the den and in conveying the same to the curing pile. One of the purposes of the present invention, therefore, is to provide means for drawing the steam and noxious fumes from the den, so that the workmen may remove the material from the den without injury to them from the poisonous gases.

The acid phosphates coming from the den have a certain percentage of free phosphoric acid which renders them damp and sticky, so that they tend to pack down and solidify. The acid phosphates cannot be sold to the farmer in this condition, because they would clog and not pass through a planter or other machine for applying the phosphates to the soil. Another purpose of the invention, therefore, is to provide means for removing the moisture from the materials, so as to render the same in dry and pulverulent condition for ready application to the soil. In carrying this feature of the invention into practical effect, the materials conveyed from the den are broken up and a current of air is passed therethrough so as to come into intimate contact with the particles and efficiently dry the same.

There is a certain amount of free sulfuric acid in the mixture leaving the den which has not had time to combine with the phosphate of lime so as to be converted into phosphoric acid, and also there is a certain amount of free phosphoric acid in the mixture. Another purpose of the invention, therefore, is to provide means for introducing finely ground or pulverized phosphate rock to the material taken from the den to combine with the free sulfuric acid and phosphoric acid, and convert the phosphate of lime into phosphoric acid, thereby materially increasing the amount of phosphoric acid obtained from the charge of materials introduced into the den. The cost of the added finely ground phosphate rock is very much less than the cost of the acid phosphate, so that by the addition of this finely ground phosphate rock to the mixture, an important economy is obtained in the production of the phosphoric acid.

By the apparatus of the present invention, the drying process and the addition of the finely ground phosphate rock to the mixture coming from the den may be continuously carried on, and the insoluble phosphoric acid may be converted into soluble phosphoric acid without the necessity for allowing the materials to stand a long period in a curing pile to obtain further chemical reaction. Heretofore, the materials needed to stand in the curing pile anywhere from thirty to sixty days, whereas, by the present invention, the materials may be so treated that they will be in readiness for shipment within a short period, such, for example, as about a week, to allow the same to cool. This reduces the size of the plant required for the manufacture of the acid phosphate, and it eliminates the necessity for storage of a large stock of the acid phosphate to meet the shipping requirements.

With the aforesaid and other purposes in view, the character of the invention will be best understood by reference to the following description of one good form of apparatus embodying the invention shown in the accompanying drawings, wherein:.

Figure 1 is a vertical longitudinal section through one form of apparatus embodying the invention;

Figure 2:
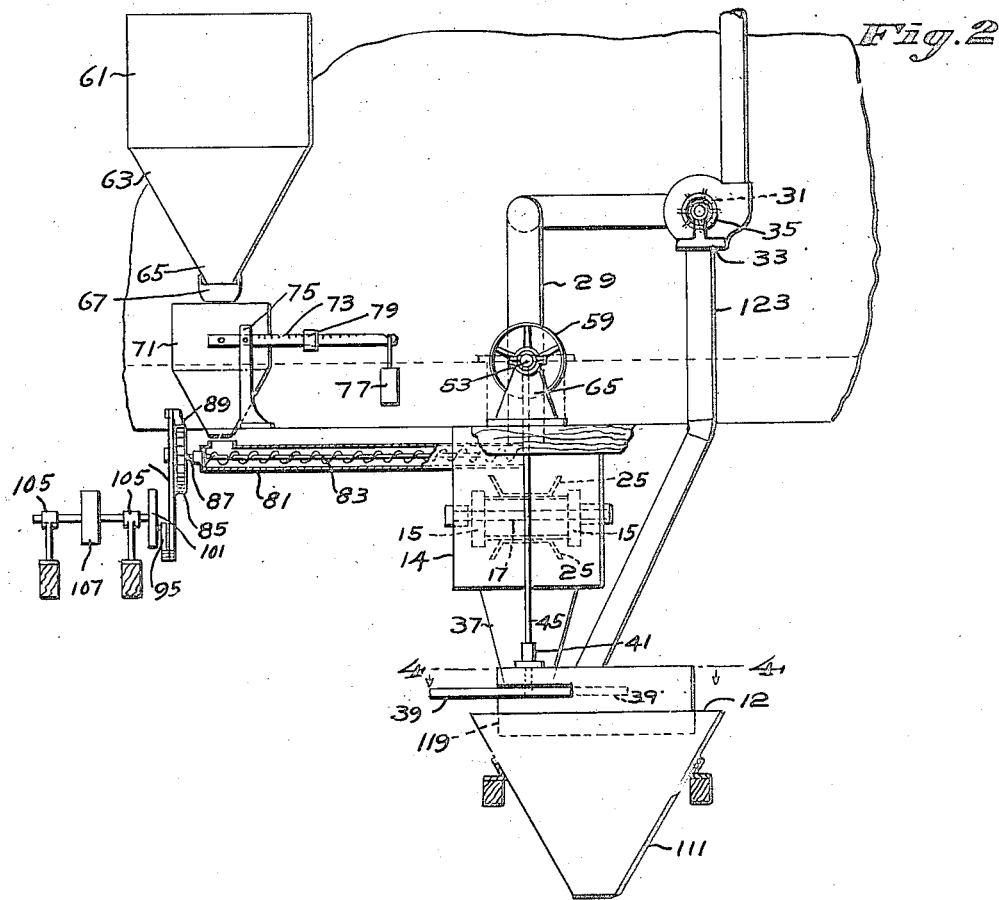
Fig. 2 is a vertical transverse section through the apparatus.
Figure 4:
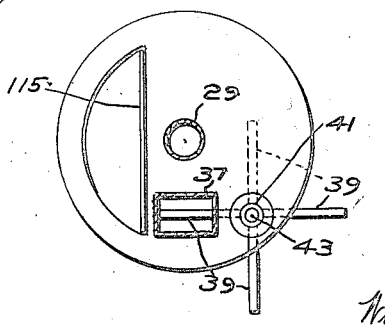

Fig. 3, on an enlarged scale, is a vertical section taken on line 3—3 of Fig. 1;

Fig. 4 is a horizontal section taken on line 4—4 of Fig. 2; and

Figs. 5 and 6 on an enlarged scale are details of the conveyer.

Referring to the drawings, the apparatus shown therein as embodying the invention, comprises a mixer 1 of usual construction, into which the ground phosphate rock and the sulfuric acid may be mixed.

A suitable den 2 may be provided to receive the materials from the mixer. In the present instance, this den comprises vertical walls 3 and a roof 5 conveniently of concrete one of the walls having a door 7 to admit the workmen into the den. At the bottom of the den is a floor 9 which may have an elongated opening 11 (Fig. 3) therein, which may be covered by a series of boards 13.

Beneath the den is a housing 14 containing an endless conveyer, in the present instance, comprising a pair of sprocket wheels 15 on a shaft 17, and sprocket wheels 19 on a shaft 21. These sprocket wheels may be connected by sprocket chains 23 which may carry trough sections 25 of sufficient length so as to overlap in the upper horizontal run thereof, and in effect provide a continuous trough for receiving materials delivered from the den through the elongated opening 11, as more fully hereinafter described. The upper horizontal runs of the sprocket chains may be guided by bars 27 supported on frames 29.

After the mixture has remained in the den for a period, such, for example, as twenty-four hours, the workmen may enter the den through the door 7 and progressively lift the boards 13 on the floor above the elongated slot 11, and by means of picks or other suitable means break down the materials and deliver the same through the slot 11 onto the endless conveyer.

As stated, steam and noxious fumes are generated in the den, and the materials leave the same in a moist condition. Next will be described the means for drawing the steam and noxious fumes from the den, and for drying the surfaces of the materials as they are conducted from the den by the conveyer. This means, in the present instance, comprises a pipe or conduit 29 having one end communicating with the housing 14 referred to, adjacent the delivery end of the conveyer. A blower or fan 31 of well known construction may be provided in a box 33 communicating with the pipe 29, said fan being driven by a pulley 35 from any suitable source of power.

The construction is such that on rotation of the fan a suction effect will be produced in the pipe 29 and the housing 14 which will draw the steam and noxious fumes from the den and produce an air draft above the materials carried by the conveyer so as to tend to remove moisture from said materials.

The materials delivered from the conveyer are in lump or closely compact form, and therefore, it is desirable to break the same up into finely divided or pulverulent form. To accomplish this, a hopper 37 may be provided having its upper end communicating with the housing 14 adjacent the delivery end of the conveyer, so that the materials may be delivered by the conveyer into said hopper. At the lower end of the hopper 37 is a device for breaking up the materials, conveniently in the form of a slicer, in the present instance, comprising blunt arms or bars 39 projecting from a hub 41 fast on a vertical shaft 43 journaled in bearings 45 and 47. At the upper end of said shaft is a bevel gear 49 meshing with a bevel gear 51 fast on a horizontal shaft 53 journaled in bearings 55 and provided with fast and loose pulleys 57 and 59 for driving the rotary slicer as desired. This rotary slicer may be driven at a high speed so as to cause the arms 39 thereof rapidly to pass the delivery end of the hopper 37 so as to slice and break up the materials as they are delivered from the hopper.

Suitable means may be provided for adding the pulverulent phosphate rock to the materials delivered from the conveyer into the hopper 37. It is desirable that a predetermined amount of this pulverulent rock shall be added to the materials. For example, if the charge of ground phosphate rock and sulfuric acid introduced into the den is 2,000 lbs., the proportion of pulverulent phosphate rock added may desirably be 50 lbs., but this proportion may be varied more or less.

The pulverulent phosphate rock to be added may be introduced into a chamber 61 having a delivery hopper 63 at the lower end thereof, provided with a discharge mouth 65 and a gate or valve 67 for controlling the discharge from said mouth.

A weighing apparatus may be provided beneath the hopper 63, in the present instance, comprising a weighing receptacle 71 carried adjacent one end of a weighing beam 73 fulcrumed on a support 75 intermediate the ends of said beam. A weight 77 may be provided on the beam to counterbalance the weight of the receptacle 71, and the beam may be provided with a poise 79 which may be adjusted along the beam to different positions according to the weight of pulverulent phosphate rock to be introduced into the weighing receptacle.

Suitable means may be provided to conduct the materials from the weighing receptacle into the delivery end of the housing 14 above the hopper 37. This means, in the present instance, comprises a tube 81 containing a screw conveyer 83 which may be rotated by suitable means. In the present instance, this means comprises a ratchet 85 fast on the screw conveyer shaft 87, and adapted to be advanced step by step by pawls 89 on a pair of arms 91 projecting from the lever 93 fulcrumed on the shaft 87. The lower end of this lever may be adjustably connected to one end of a link 95, the opposite end of which may be connected to a wrist pin 97 adapted to set in any of a series of holes 99 located at different radial distances from the axis of a disk 101 mounted on a horizontal shaft 103 journaled in bearings 105, said shaft having a pulley 107 thereon adapted to be driven from any suitable source of power.

The construction is such that a charge of the finely ground phosphate rock to be added may be fed from the weighing receptacle 71 by the screw conveyer 83 into the delivery end of the housing 14 above the hopper 37. Here it will combine with the materials delivered by the endless conveyer from the den, and will be mixed with said materials as they are delivered from said hopper and broken up by the rotary slicer.

Suitable means may be provided for causing a current of air to pass through the materials delivered from the hopper 37, in order continuously to remove the moisture therefrom. To accomplish this, in the present instance, a receiving hopper 111 may be provided beneath the hopper 37, and a box 113 may be provided at the upper end of the receiving hopper. The upper end of this box may be closed and provided with a door 115 to enable access into the interior thereof. The lower end 117 of this box may be open, and the wall 119 of the box may have a diameter less than the mouth of the receiving hopper 111 to afford an annular air inlet 121.

A pipe or air conduit 123 may have its lower end communicating with the box 113 through the top thereof, and the upper end of said pipe may be connected to and communicate with the pipe 29 referred to.

The construction is such that the blower or fan 31 provided for the pipe 29 will cause a current of air to flow downward through the annular inlet 121 into the receiving hopper 111, and thence upward through the box 113 and pipe 123. This air current will come in contact with the materials pulverized by the slicer, and remove moisture therefrom.

The materials may be delivered from the receiving hopper 111 and be conveyed by a car or other suitable means to the place desired, so as to be in readiness for shipment.

The operation of the apparatus will be readily understood. The finely ground phosphate rock, and the sulfuric acid are introduced in equal parts by weight into the mixer, and delivered therefrom into the den. The materials are allowed to stand in the den about twenty-four hours to allow the chemical reaction to take place which converts the insoluble phosphoric acid into soluble phosphoric acid. However, all of the insoluble phosphoric acid is not converted into soluble phosphoric acid in the den. The workmen may progressively lift the boards 13 and pick down and deliver the materials from the den through the elongated passage 11 to the conveyer. The latter will conduct the materials from the den to the hopper 37.

The mixture contains a certain amount of free sulfuric acid which has not had sufficient time to combine with the phosphate of lime and be converted into phosphoric acid, and also contains a certain amount of free phosphoric acid.

By the introduction of the dry, finely ground phosphate of lime into the mixture as it is delivered to the hopper, the free sulfuric acid and phosphoric acid may combine with the finely ground phosphate rock and convert the latter into phosphoric acid. Thus, the percentage of phosphoric acid obtained from the charge originally introduced into the den is materially increased. The value of the added ground phosphate rock is very much less than the value of the acid phosphate, and therefore, the addition of the ground phosphate rock to utilize the free sulfuric acid and phosphoric acid of the charge effects an important saving.

The blower will draw the steam and noxious fumes from the den through the conveyer housing and away therefrom so as to enable the workmen to enter the den and pick down and deliver the mixture from the den to the conveyer without discomfort or injury therefrom, and the current of air passing over the mixture being conveyed will tend to dry the surface portions of the mixture, but a substantial amount of moisture still remains in the mixture, which tends to cause the particles thereof to adhere together in the form of lumps and confine the moisture therein. It is, therefore, desirable to break up or pulverize the mixture delivered from the conveyer, in order to liberate the moisture therefrom. This is accomplished by the rotary slicer which operates at a high speed and thoroughly breaks up and pulverizes the materials delivered from the hopper.

The moisture thus liberated is removed from the materials by the current of air which flows downward through the annular inlet, and thence upward through the box and pipe leading to the blower. This current of air comes into contact with the materials broken up and whirled in the box at the upper end of the hopper, and effectively removes the liberated moisture therefrom. This intensive air treatment of the materials thus broken up dries the same sufficiently, so that the materials are in condition for shipment after they have stood for a few days to allow the materials time to cool, since the free sulfuric acid and phosphoric acid have combined with the finely ground phosphate rock substantially to complete the chemical reaction of the sulfuric acid, the insoluble phosphoric acid of the mixture is converted into soluble phosphoric acid in sufficient amount, so that it is unnecessary to transfer the mixture to a curing pile and allow the same to stand from thirty to sixty days as has heretofore been necessary, in order to allow the chemical reaction to be completed, but, on the contrary, the materials are in condition for immediate shipment as soon as cool.

As a consequence, the preparation of the mixture may be substantially continuous, and important economies are obtained. It is unnecessary to provide a large storage space for the mixture to enable the chemical reaction to complete. It is unnecessary to transfer the materials from the apparatus to such storage place, and it is unnecessary to pulverize the materials again before shipment.

It will be understood that the invention is not limited to the specific embodiment shown, and that various deviations may be made therefrom without departing from the spirit and scope of the appended claims.

What is claimed is:—

1. An apparatus for manufacturing acid phosphate, comprising, in combination, means for mixing ground phosphate rock and sulfuric acid, means for introducing the mixture into a storage den, means for conveying the mixture from said den, a housing for said conveying means for communication with said den, means for adding pulverulent phosphate rock to the mixture to take up free sulfuric acid and phosphoric acid in the mixture, means to pulverize the mixture delivered by the conveyer, and means to draw steam and fumes from the den through the housing and also from the pulverizer.

2. An apparatus for manufacturing acid phosphate, comprising, in combination, a storage den adapted to receive a mixture of ground phosphate rock and sulfuric acid, a housing adapted to communicate with said den, a conveyer in said housing for conducting the mixture from said housing, a pipe communicating with said housing and a suction device for drawing steam and fumes liberated from the mixture in the den through said housing and pipe.

3. An apparatus for manufacturing acid phosphate, comprising, in combination, a storage den adapted to receive a mixture of ground phosphate rock and sulfuric acid, a housing adapted to communicate with said den, a conveyer in said housing for receiving the mixture from said den and for conducting the same through said housing, means for breaking up the mixture delivered from said conveyer and vapor exhausting means communicating with the breaking means.

4. An apparatus for manufacturing acid phosphate, comprising, in combination, a storage den adapted to receive a mixture of ground phosphate rock and sulfuric acid, means to break up the mixture after leaving said den, means to deliver the materials from the den to the means for breaking up the mixture, and means for removing the moisture from the mixture as it is broken up.

5. An apparatus for manufacturing acid phosphate, comprising, in combination, a storage den for receiving a mixture of ground phosphate rock and sulfuric acid, means for delivering the mixture from the den, means for adding a percentage of pulverulent phosphate rock to the mixture after delivery of the latter from the den, and means for removing moisture from the mixture.

6. An apparatus for manufacturing acid phosphate, comprising, in combination, a storage den for receiving a mixture of ground phosphate rock and sulfuric acid, means for delivering the mixture from the den, means for pulverizing the mixture after delivery thereof from the den, means for adding pulverulent phosphate rock to the mixture, and means to pass an air current through the pulverized mixture.

7. An apparatus for manufacturing acid phosphate, comprising, in combination, a storage den for receiving a mixture of ground phosphate rock and sulfuric acid, and means including weighing means for adding a predetermined amount of pulverulent phosphate rock to the mixture after delivery of the latter from the den.

8. An apparatus for manufacturing acid phosphate, comprising, in combination, a storage den for receiving a mixture of ground phosphate rock and sulfuric acid, a hopper, means to deliver the mixture from said den to said hopper, a chamber for receiving pulverulent phosphate rock, weighing means for receiving the pulverulent phosphate rock from said chamber, means to feed the phosphate rock from the weighing means to the mixture in the hopper, means to pulverize the mixture, and means to remove vapors liberated during pulverization of the mixture.

9. An apparatus for manufacturing acid phosphate, comprising, in combination, a storage den for receiving a mixture of ground phosphate rock and sulfuric acid, a housing, a conveyer in said housing for receiving the mixture from said den, a hopper for receiving the mixture from said conveyer, a chamber for receiving pulverulent phosphate rock, weighing means for receiving the pulverulent phosphate rock from said chamber, a tube leading from said weighing means to said hopper, a screw conveyer in said tube, a rotary slicer for breaking up the mixture delivered from said hopper, a receiving hopper for the materials broken up by said slicer, a suction device, and pipes leading from said suction device to said housing and receiving hopper.

In testimony whereof, I have signed my name to this specification.

WILLIAM T. DOYLE.